United States Patent [19]

Steedman et al.

[11] Patent Number: 6,034,174
[45] Date of Patent: Mar. 7, 2000

[54] ADDITIVE SYSTEM TO IMPROVE ADHESION AND HYDROLYTIC STABILITY OF SILICONE ELASTOMERS

[75] Inventors: Adrian Malcolm Steedman; Uwe Adler, both of Hoogerheide, Netherlands

[73] Assignee: General Electric Company, Pittsfield, Mass.

[21] Appl. No.: 08/926,909

[22] Filed: Sep. 10, 1997

[51] Int. Cl.[7] .............................. C08K 83/02; C08L 83/05
[52] U.S. Cl. .............................. 524/862; 428/447; 528/15
[58] Field of Search .............................. 528/15; 524/862; 428/447

[56] References Cited

U.S. PATENT DOCUMENTS

| | | |
|---|---|---|
| 3,960,800 | 6/1976 | Kohl, Jr. . |
| 4,087,585 | 5/1978 | Schulz ..................................... 428/429 |
| 4,483,973 | 11/1984 | Lucas et al. . |
| 4,528,353 | 7/1985 | Lucas et al. . |
| 4,774,035 | 9/1988 | Carmelite et al. ........................ 264/1.4 |
| 4,997,882 | 3/1991 | Martz et al. . |
| 5,213,899 | 5/1993 | Lucas . |
| 5,420,196 | 5/1995 | Lucas . |

FOREIGN PATENT DOCUMENTS 55133452  10/1980  Japan .

*Primary Examiner*—Robert Dawson
*Assistant Examiner*—D. Aylward

[57] ABSTRACT

An adhesion promoting method and a corresponding composition for improving the performance of silicone elastomers at high humidity are disclosed. The improved adhesion promoter comprises: (a) an epoxy functional silane; and (b) an acid. The acid may be phosphoric acid or any organic acid. Acetic and citric acids are preferred. The inclusion of the epoxy functional silane and acid in a standard silicone elastomer system provides greatly enhanced stability and adhesion under conditions of high humidity.

23 Claims, No Drawings

ADDITIVE SYSTEM TO IMPROVE ADHESION AND HYDROLYTIC STABILITY OF SILICONE ELASTOMERS

FIELD OF THE INVENTION

The invention relates to an adhesion promoter for silicone elastomers.

BACKGROUND OF THE INVENTION

Adhering silicone elastomers to various substrates is a continuing problem. Although the use of adhesion promoters in silicone elastomers is well known (see, for example, U.S. Pat. Nos. 4,483,973; 4,997,882; 5,213,899 and 4,528,353), the performance of known compositions under conditions of high humidity is generally poor. In particular, most compositions, including those that have good initial adhesion, fail when exposed to cycles of heating and cooling at 95% relative humidity.

There is, therefore, a need for an additive system to improve the adhesion and hydrolytic stability of silicone elastomers. This need is satisfied, the limitations of the prior art overcome, and other benefits realized in accordance with the principles of the present invention.

SUMMARY OF THE INVENTION

In one aspect, the invention relates to an improved adhesion promoting composition for increasing the durability of adhesion of silicone elastomers at high humidity comprising: (a) an epoxy functional silane; and (b) an acid chosen from the group of organic acids and phosphoric acid.

In another aspect the invention relates to an addition-cure silicone elastomer composition comprising: (a) an addition curable polysiloxane resin; (b) a curing agent for the addition curable resin; and (c) an adhesion promoter. The adhesion promoter comprises (i) an epoxy functional silane and (ii) an acid. The epoxy functional silane may be, for example, β-3,4-epoxycyclohexylethyl trimethoxysilane or γ-glycidoxypropyl trimethoxysilane. The acid may be an organic acid or phosphoric acid. Preferred organic acids are $C_1$ to $C_{20}$ carboxylic acids, particularly acetic acid and citric acid. $C_1$ to $C_{20}$ sulfonic acids may also be used.

In another aspect, the invention relates to a method for improving the performance of an epoxy functional silane adhesion promoter under high humidity. The method comprises adding phosphoric acid or an organic acid to an epoxy functional silane adhesion promoter. The combination of acid and epoxy functional silane provides greatly increased adhesion of the resulting silicone elastomer following exposure to high humidity.

In another aspect, the invention relates to an article comprising a substrate having the above described cured silicone elastomer adherent thereon. The elastomer thereby includes residues derived from an epoxy functional silane and the organic or phosphoric acid. In one embodiment, the article is a polyamide substrate coated with the elastomer.

DETAILED DESCRIPTION OF THE INVENTION

In its most basic aspect, the invention relates to an adhesion promoting method and a corresponding composition for improving the performance of silicone elastomers at high humidity. The improved adhesion promoter comprises: (a) an epoxy functional silane; and (b) an acid.

The epoxy functional silane can be any of the well known members of this class. Epoxy functional silanes suitable for use as adhesion promoters in silicone elastomer compositions are described in U.S. Pat. No. 4,483,973, the disclosure of which is incorporated herein by reference. Non-limiting examples include: epoxycyclohexylethyl trimethoxysilane; γ-glycidoxypropyl trimethoxysilane; γ-glycidoxypropyl triethoxysilane; γ-glycidoxypropyl methyldimethoxysilane; and γ-glycidoxypropyl methyldiethoxysilane.

Suitable acids for the compositions of the present invention include, for example: acetic, benzenesulfonic, benzoic, camphorsulfonic, citric, ethanesulfonic, fumaric, gluconic, glutamic, lactic, maleic, malic, mandelic, methanesulfonic, oxalic, phosphoric, pyruvic, succinic, tartaric, p-toluenesulfonic, and the like.

The acid/epoxysilane adhesion promoter may be used to create an addition cure silicone elastomer composition by adding it to an addition curable polysiloxane resin and the curing agent for the addition curable resin. An example of such a resin system is:(a) 200 parts by weight of a vinyl-containing polydiorganosiloxane; (b) from 0.2 to 10 parts of a hydrogen-containing polysiloxane; (c)a catalytic amount of a hydrosilylation catalyst; and (d)from 0.2 to 10 parts of the acid/epoxysilane adhesion promoter described above. In many preferred embodiments the adhesion promoter is 1 part by weight acid to 1 to 10 parts by weight of epoxy functional silane, and in a particularly preferred embodiment, the acid is present at about 1 part by weight per 2 to 4 parts by weight of epoxy functional silane. A preferred vinyl-containing polydiorganosiloxane is a vinyl-containing polydimethylsiloxane.

Silicone polymers of appropriate molecular weight must be cross-linked to provide elastomeric properties. Many curing, i.e., cross-linking, systems have been developed for silicone elastomers, and several are widely used commercially. Silicone elastomers are supplied as uncured rubbers that are based on polymers of intermediate molecular weights and viscosities, e.g., 100–1,000,000 $m^2/s$ (=cSt) at 25° C. Curing is based on chemical reactions that increase polymer molecular weights and provide cross-linking.

To demonstrate the efficacy of the adhesion promoting system of the invention, a standard coating formulation of an addition cure silicone was prepared and the abrasion resistance determined before and after the conditioning cycle. The starting formulation of the two components of the elastomeric coating were:

Base Component
- 67.9 parts by weight of vinyl terminated polydimethylsiloxane (PDMS) polymer
- 22.6 parts vinyl terminated PDMS and methyl vinyl silicone resin
- 9.0 parts polymethylhydrogen siloxane
- 0.5 parts inhibitor solution Catalyst Component
- 10 60.0 parts vinyl terminated PDMS polymer
- 39.7 parts vinyl terminated PDMS and methyl vinyl silicone resin
- 0.3 parts platinum catalyst The base and catalyst components were thoroughly mixed in a one-to-one ratio, applied to a nylon, i.e., a polyamide, substrate using standard knife coating techniques, and cured by heating for two minutes in a forced-air oven at 160° C. Abrasion resistance was determined using a scrub tester supplied by SNEJPS (France) which meets the requirements of ISO 5981. The abrasion resistance was determined before and after an aging or conditioning cycle, which consisted of 24 hours at −40° C., 24 hours at 85° C. with 95% relative humidity and then 8 cycles of −40° C. to 105° C. and back. Results are expressed in number of abrasion cycles completed before degradation of the coating. Table 1 shows the results of the testing of the standard formulation and the standard formulation with three different adhesion promoters not embodying the invention.

TABLE 1

| ADDITIVE | # OF SCRUBS BEFORE STRESS | # OF SCRUB AFTER STRESS |
|---|---|---|
| none (control) | >3000 | 30 |
| 3-methacryloxypropyl trimethoxysilane | >3000 | 150 |
| 3,4-epoxycyclohexylethyl trimethoxysilane | >3000 | 300 |
| glycidoxypropyl trimethoxysilane | >3000 | 180 |

From Table 1, it can be seen that serious degradation of the adhesion of the coating occurred following the conditioning cycle and that the conventional adhesion promoters did little to improve the situation.

When, according to the invention, acid was added to the epoxy functional silane adhesion promoter, a dramatic improvement was observed. Upon the addition of one part acetic acid per 7.5 parts of 3,4-epoxycyclohexylethyl trimethoxysilane, the number of scrubs after stress rose to greater than 3,000. Although acetic acid functions splendidly in the invention, the odor associated with acetic acid can be unacceptable in certain applications. Therefore, acetic acid was replaced with citric acid. The results for both are shown below in Table 2.

TABLE 2

| ADDITIVE | # OF SCRUBS BEFORE STRESS | # OF SCRUBS AFTER STRESS |
|---|---|---|
| 3,4-epoxycyclohexylethyl trimethoxysilane | >3000 | 300 |
| 3,4-epoxycyclohexylethyl trimethoxysilane plus acetic acid | >3000 | >3000 |
| 3,4-epoxycyclohexylethyl trimethoxysilane plus citric acid | >3000 | >3000 |

The effect of varying amounts of acid and adhesion promoter were explored. The results are shown below in Tables 3 through 5. For the particular application for which the experiments were carried out, it was desirable to include a hydride fluid to give a harder and drier coating, and the proportions of the hydride fluid are shown in the tables as well. The base composition was as shown above, and the amounts shown in the tables are parts by weight per 200 parts by weight of the combined base plus catalyst composition. The order of addition was base component, catalyst component, epoxy functional silane, hydride fluid for increased cross link density (optional) and acid. The elastomer was spread and then cured at 1600 for two minutes. The results are shown in Tables 3 to 5.

Although this invention is susceptible to embodiment in many different forms, preferred embodiments of the invention are described below. It should be understood, however, that the present disclosure is to be considered as an exemplification of the principles of this invention and is not intended to limit the invention to the embodiments described. The particular epoxy silanes shown below in the examples were chosen simply on the basis of their ready commercial availability and cost. Similarly, any organic acid would function analogously to the two illustrated below; they were also chosen on the basis of their ready availability and cost.

The following definitions and abbreviations are employed in Tables and Examples:

SLE5700A/B is the commercial designation of the polysiloxane resin and gum system described above as the control. It is commercially available from General Electric Silicones. It is a low viscosity polymer useful for knife-over-roll coating techniques. Following standard convention, the "A" component includes the base resin and crosslinker; the "B" component includes the base resin and catalyst.

SL6020 is a hydride fluid which improves the cross-link density, giving a harder and drier polymer coating, when such is desired. It is commercially available from GE Silicones.

A-186 is β-3,4-epoxycyclohecylethyl trimethoxysilane.
A-187 is γ-glycidoxypropyl trimethoxysilane.

TABLE 3

| EXPT # | SL 6020 (parts) | ADHESION PROMOTER A-187 (parts) | CITRIC ACID (parts) | # OF SCRUBS (BEFORE STRESS) | # OF SCRUBS (AFTER STRESS) |
|---|---|---|---|---|---|
| 1 | 6 | 3 | 1.0 | >1000 | 2200 |
| 2 | 6 | 6 | 1.0 | >1000 | 2000–2400 |
| 3 | 10 | 6 | 1.0 | >1000 | 2100 |
| 4 | 10 | 3 | 1.0 | >1000 | 400 |
| 5 | 6 | 3 | 2.2 | >1000 | 1600 |
| 6 | 6 | 6 | 2.2 | >1000 | 1300 |
| 7 | 10 | 6 | 2.2 | >1000 | >3000 |
| 8 | 10 | 3 | 2.2 | >1000 | 1200 |
| 9 | 8 | 4.5 | 1.6 | >1000 | 400–800 |

TABLE 4

| EXPT # | SL 6020 (parts) | ADHESION PROMOTER A-186 (parts) | CITRIC ACID (parts) | # OF SCRUBS (BEFORE STRESS) | # OF SCRUBS (AFTER STRESS) |
|---|---|---|---|---|---|
| 10 | 1.0 | 0.6 | 0.10 | NA | >1000 |
| 11 | 0.6 | 0.3 | 0.22 | NA | 900 |
| 12 | 0.6 | 0.6 | 0.22 | NA | >1000 |
| 13 | 1.0 | 0.3 | 0.10 | NA | >1000 |
| 14 | 1.0 | 0.6 | 0.22 | NA | >1000 |
| 15 | 0.6 | 0.6 | 0.10 | NA | >1000 |
| 16 | 1.0 | 0.3 | 0.22 | NA | >1000 |
| 17 | 0.6 | 0.3 | 0.10 | NA | 700 |

TABLE 5

| EXPT # | SL 6020 (parts) | ADHESION PROMOTER A-187 (parts) | CITRIC ACID (parts) | # OF SCRUBS (BEFORE STRESS) | # OF SCRUBS (AFTER STRESS) |
|---|---|---|---|---|---|
| 18 | 1.0 | 0.6 | 0.10 | NA | 900 |
| 19 | 0.6 | 0.3 | 0.22 | NA | 600 |
| 20 | 0.6 | 0.6 | 0.22 | NA | >1000 |
| 21 | 1.0 | 0.3 | 0.10 | NA | 800 |
| 22 | 0.8 | 0.45 | 0.16 | NA | 750–1000 |

For the preparation of an addition cure silicone elastomer composition, one prepares two components: the A component contains the addition curable polysiloxane (e.g. a vinyl terminated PDMS polymer), the catalyst, and the epoxy functional silane; the B component contains, in addition to the addition curable polysiloxane, a curing agent (e.g. a hydrogen siloxane) and the acid. Additional components, such as the hydride fluid hardener, fillers, etc. may be added to whichever component provides compatibility, in this case the B component. A coated article is prepared by mixing the components, spreading the elastomer composition on the substrate and curing the coated article, all of which are carried out by means well known in the art.

We claim:

1. An adhesion promoting composition for improving the adhesion performance of silicone elastomers at high humidity comprising:
   (a) an epoxy functional silane; and
   (b) an acid chosen from the group of organic acids.

2. An addition-cure silicone elastomer composition comprising:
   (a) an addition curable polysiloxane resin;
   (b) a curing agent for said addition curable resin; and
   (c) an adhesion promoter comprising
      (i) an epoxy functional silane and
      (ii) an acid chosen from the group of organic acids and phosphoric acid.

3. An addition-cure silicone elastomer composition according to claim 2 comprising:
   (a) 200 parts by weight of a vinyl-containing polydiorganosiloxane;
   (b) from 1 to 40 parts of a hydrogen-containing polysiloxane;
   (b) a catalytic amount of a hydrosilylation catalyst; and
   (c) from 0.2 to 10 parts of an adhesion promoter comprising
      (i) an epoxy functional silane and
      (ii) an acid chosen from the group of organic acids and phosphoric acid.

4. The composition according to claim 2 wherein said organic acid is a $C_1$ to $C_{20}$ carboxylic acid.

5. The composition according to claim 4 wherein said acid is chosen from acetic acid and citric acid.

6. The composition according to claim 2 wherein said organic acid is a $C_1$ to $C_{20}$ sulfonic acid.

7. The composition according to claim 2 wherein said acid is present at 1 part by weight per 1 to 10 parts by weight of epoxy functional silane.

8. The composition according to claim 7 wherein said acid is present at about 1 part by weight per 2 to 4 parts by weight of epoxy functional silane.

9. The composition according to claim 2 wherein said epoxy functional silane is β-3,4-epoxycyclohexylethyl trimethoxysilane or γ-glycidoxypropyl trimethoxysilane.

10. An improved addition-cure silicone elastomer composition of the type containing an addition curable polysiloxane resin; a curing agent for the addition curable resin; and an adhesion promoter, wherein the improvement comprises:
using as the adhesion promoter a composition comprising an epoxy functional silane and 1 part by weight of an acid chosen from the group of organic acids and phosphoric acid per 1 to 10 parts by weight of the epoxy functional silane.

11. The composition according to claim 10 wherein said organic acid is selected from the group consisting of a $C_1$ to $C_{20}$ carboxylic acid and a $C_1$ to $C_{20}$ sulfonic acid.

12. The composition according to claim 11 wherein said acid is chosen from acetic acid and citric acid.

13. The composition according to claim 10 wherein said epoxy functional silane is β-3,4-epoxycyclohexylethyl trimethoxysilane or γ-glycidoxypropyl trimethoxysilane.

14. A method for improving the performance of an epoxy functional silane adhesion promoter under high humidity comprising adding to said epoxy functional silane adhesion promoter an amount of an organic acid sufficient to increase adhesion of a polysiloxane silicone elastomer incorporating said epoxy functional silane adhesion promoter following exposure to high humidity.

15. The method of claim 14 wherein 1 part by weight of acid is added per 1–10 parts by weight of said epoxy functional silane adhesion promoter.

16. The method according to claim 14 wherein said organic acid is selected from the group consisting of a $C_1$ to $C_{20}$ carboxylic acid and a $C_1$ to $C_{20}$ sulfonic acid.

17. The method of claim 16 wherein said acid is chosen from acetic acid and citric acid.

18. The method of claim 14 wherein said epoxy functional silane is β-3,4-epoxycyclohexylethyl trimethoxysilane or γ-glycidoxypropyl trimethoxysilane.

19. An article comprising a substrate and a cured silicone elastomer adherent thereon, said silicone elastomer comprising the adhesion promoting composition of claim 1, said elastomer including residues derived from an epoxy functional silane and an organic acid.

20. The article of claim 19, wherein the substrate is a polyamide substrate.

21. An article comprising a substrate and the cured silicone elastomer of claim 2 adherent thereon.

22. The article of claim 21, wherein the substrate is a polyamide substrate.

23. A method for improving the performance of an epoxy functional silane adhesion promoter under high humidity comprising adding to said epoxy functional silane adhesion promoter an amount of phosphoric acid or an organic acid sufficient to increase adhesion of a polysiloxane silicone elastomer incorporating said epoxy functional silane adhesion promoter following exposure to high humidity, wherein the silicone elastomer comprises the addition-cure silicone elastomer of claim 2.

* * * * *